United States Patent
King et al.

(10) Patent No.: US 9,201,580 B2
(45) Date of Patent: Dec. 1, 2015

(54) SOUND ALIGNMENT USER INTERFACE

(71) Applicant: Adobe Systems Incorporated, San Jose, CA (US)

(72) Inventors: Brian John King, Seattle, WA (US); Gautham J. Mysore, San Francisco, CA (US); Paris Smaragdis, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 268 days.

(21) Appl. No.: 13/675,807

(22) Filed: Nov. 13, 2012

(65) Prior Publication Data

US 2014/0136976 A1     May 15, 2014

(51) Int. Cl.
*G06F 17/00* (2006.01)
*G06F 3/0484* (2013.01)
*H04S 7/00* (2006.01)

(52) U.S. Cl.
CPC .............. *G06F 3/04847* (2013.01); *H04S 7/30* (2013.01); *H04S 2400/15* (2013.01)

(58) Field of Classification Search
CPC ............... G06F 17/30017; G06F 17/30743; G10H 2210/385; G10H 2220/116; G10H 7/008; G10L 21/04; G11B 27/031
See application file for complete search history.

(56) References Cited

U.S. PATENT DOCUMENTS

| | | | |
|---|---|---|---|
| 4,591,928 A | 5/1986 | Bloom et al. | |
| 5,151,998 A * | 9/1992 | Capps | ............................ 704/278 |
| 5,652,828 A | 7/1997 | Silverman | |
| 5,671,283 A | 9/1997 | Michener et al. | |
| 5,749,073 A | 5/1998 | Slaney | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 | 11/2001 | Laroche | |
| 6,333,983 B1 | 12/2001 | Enichen | |
| 6,370,247 B1 | 4/2002 | Takaragi et al. | |
| 6,480,957 B1 | 11/2002 | Liao et al. | |

(Continued)

FOREIGN PATENT DOCUMENTS

WO     WO-2010086317     8/2010

OTHER PUBLICATIONS

Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, pp. 337-344.

(Continued)

*Primary Examiner* — Curtis Kuntz
*Assistant Examiner* — Thomas Maung
(74) *Attorney, Agent, or Firm* — Wolfe-SBMC

(57) ABSTRACT

Sound alignment user interface techniques are described. In one or more implementations, a user interface is output having a first representation of sound data generated from a first sound signal and a second representation of sound data generated from a second sound signal. One or more inputs are received, via interaction with the user interface, that indicate that a first point in time in the first representation corresponds to a second point in time in the second representation. Aligned sound data is generated from the sound data from the first and second sound signals based at least in part on correspondence of the first point in time in the sound data generated from the first sound signal to the second point in time in the sound data generated from the second sound signal.

20 Claims, 7 Drawing Sheets

(56) References Cited

U.S. PATENT DOCUMENTS

| | | |
|---|---|---|
| 6,778,667 B1 | 8/2004 | Bakhle et al. |
| 6,792,113 B1 | 9/2004 | Ansell et al. |
| 6,804,355 B1 | 10/2004 | Graunke |
| 7,003,107 B2 | 2/2006 | Ananth |
| 7,103,181 B2 | 9/2006 | Ananth |
| 7,130,467 B1 | 10/2006 | Bronder et al. |
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 | 2/2011 | Banner et al. |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,184,182 B2 | 5/2012 | Lee et al. |
| 8,189,769 B2 | 5/2012 | Ramasamy et al. |
| 8,199,216 B2 | 6/2012 | Hwang |
| 8,205,148 B1 * | 6/2012 | Sharpe et al. .................. 715/203 |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 | 3/2013 | Wang et al. |
| 8,417,806 B2 | 4/2013 | Chawla et al. |
| 8,428,390 B2 | 4/2013 | Li et al. |
| 8,447,098 B1 | 5/2013 | Cohen et al. |
| 8,520,083 B2 | 8/2013 | Webster et al. |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,586,847 B2 | 11/2013 | Ellis et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,751,022 B2 | 6/2014 | Eppolito |
| 8,805,560 B1 | 8/2014 | Tzanetakis et al. |
| 8,855,334 B1 | 10/2014 | Lavine et al. |
| 8,879,731 B2 | 11/2014 | Schultz |
| 8,886,543 B1 | 11/2014 | Sharifi et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 9,064,318 B2 | 6/2015 | Price et al. |
| 9,076,205 B2 | 7/2015 | Cho et al. |
| 9,135,710 B2 | 9/2015 | Cohen et al. |
| 2002/0154779 A1 | 10/2002 | Asano et al. |
| 2004/0030656 A1 | 2/2004 | Kambayashi et al. |
| 2004/0254660 A1 | 12/2004 | Seefeldt |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 * | 7/2006 | Bloom et al. .................. 381/56 |
| 2006/0173846 A1 | 8/2006 | Omae et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0291958 A1 | 12/2007 | Jehan |
| 2008/0120230 A1 | 5/2008 | Lebegue et al. |
| 2009/0055139 A1 | 2/2009 | Agarwal et al. |
| 2009/0125726 A1 | 5/2009 | Iyer et al. |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0306972 A1 | 12/2009 | Opitz et al. |
| 2009/0307489 A1 | 12/2009 | Endoh |
| 2009/0315670 A1 | 12/2009 | Naressi et al. |
| 2010/0023864 A1 | 1/2010 | Lengeling et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0322042 A1 * | 12/2010 | Serletic et al. .................. 369/1 |
| 2011/0043864 A1 | 2/2011 | Tian et al. |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2011/0261257 A1 | 10/2011 | Terry et al. |
| 2012/0042167 A1 | 2/2012 | Marking et al. |
| 2012/0046954 A1 | 2/2012 | Lindahl et al. |
| 2012/0056982 A1 | 3/2012 | Katz et al. |
| 2012/0151320 A1 | 6/2012 | McClements, IV |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 | 8/2012 | Springer et al. |
| 2012/0321172 A1 | 12/2012 | Jachalsky et al. |
| 2013/0064443 A1 | 3/2013 | Schlosser et al. |
| 2013/0113881 A1 | 5/2013 | Barnum |
| 2013/0127824 A1 | 5/2013 | Cohen |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0243313 A1 | 9/2013 | Civit et al. |
| 2013/0243314 A1 | 9/2013 | Civit et al. |
| 2013/0290818 A1 | 10/2013 | Arrasvuori et al. |
| 2013/0343606 A1 | 12/2013 | Dal Mutto et al. |
| 2014/0023291 A1 | 1/2014 | Lin |
| 2014/0119643 A1 | 5/2014 | Price |
| 2014/0133675 A1 | 5/2014 | King et al. |
| 2014/0135962 A1 | 5/2014 | King et al. |
| 2014/0140626 A1 | 5/2014 | Cho |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

Non-Final Office Action, U.S. Appl. No. 13/680,952, Aug. 4, 2014, 8 pages.

Notice of Allowance, U.S. Appl. No. 13/309,982, Jul. 30, 2014, 6 pages.

(56) References Cited

OTHER PUBLICATIONS

Notice of Allowance, U.S. Appl. No. 13/310,032, Aug. 26, 2014, 6 pages.
Restriction Requirement, U.S. Appl. No. 13/660,159, Jun. 12, 2014, 6 pages.
Non-Final Office Action, U.S. Appl. No. 13/310,032, Mar. 7, 2014, 21 pages.
Non-Final Office Action, U.S. Appl. No. 13/309,982, Mar. 24, 2014, 35 pages.
Non-Final Office Action, U.S. Appl. No. 13/690,755, Mar. 28, 2014, 7 pages.
Non-Final Office Action, U.S. Appl. No. 13/309,982, (Jan. 17, 2013), 32 pages.
Non-Final Office Action, U.S. Appl. No. 13/310,032, (Jan. 3, 2013), 18 pages.
"Time Domain Pitch Scaling using Synchronous Overlap and Add", retrieved from <http://homepages.inspire.net.nz/~jamckinnon/report/sola.htm> on Nov. 12, 2012, 3 pages.
"Waveform Similarity Based Overlap-Add (WSOLA)", retrieved from <http://www.pjsip.org/pjmedia/docs/html/group_PJMED_WSOLA.htm> on Nov. 12, 2012, 4 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.
Dolson, Mark "The Phase Vocoder: A Tutorial", retrieved from <http://www.panix.com/~jens/pvoc-dolson.par> on Nov. 12, 2012, 11 pages.
Gutierrez-Osuna, Ricardo "L19: Prosodic Modification of Speech", Lecture based on [Taylor, 2009. ch. 14; Holmes, 2001, ch. 5; Moulines and Charpentier, 1990], retrieved from <http://research.cs.tamu.edu/prism/lectures/sp/l19.pdf> on Nov. 12, 2012, 35 pages.
He, et al., "Corner detector based on global and local curvature properties", Retrieved from <http://hub.hku.hk/bitstream/10722/57246/1/142282.pdf> on Dec. 21, 2012, (May 2008), 13 pages.
Hirsch, et al., "Fast Removal of Non-uniform Camera Shake", Retrieved from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Klingbeil, Michael "SPEAR: Sinusoidal Partial Editing Analysis and Resynthesis", retrieved from <http://www.klingbeil.com/spear/> on Nov. 12, 2012, 3 pages.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
McAulay, R. J., et al., "Speech Processing Based on a Sinusoidal Model", *The Lincoln Laboratory Journal*, vol. 1, No. 2, 1998, retrieved from <http://www.ll.mit.edu/publications/journal/pdf/vol01_no2/1.2.3.speechprocessing.pdf> on Nov. 12, 2012,(1988), pp. 153-168.
Moinet, Alexis et al., "PVSOLA: A Phase Vocoder with Synchronized Overlap-Add", *Proc. of the 14th Int. Conference on Digital Audio Effects (DAFx-11)*, Paris, France, Sep. 19-23, 2011, retrieved from <http://tcts.fpms.ac.be/publications/papers/2011/dafx2011_pvsola_amtd.pdf> Nov. 12, 2012,(Sep. 19, 2011), 7 pages.
Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Rodet, Xavier "Musical Sound Signal Analysis/Synthesis: Sinusoidal+Residual and Elementary Waveform Models", *TFTS'97 (IEEE Time-Frequency and Time-Scale Workshop 97)*, Coventry, Grande Bretagne, août, 1997, retrieved from <http://articles.ircam.fr/textes/Rodet97e/index.html> on Nov. 12, 2012,(1997), 16 pages.
Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.
Serra, Xavier "Musical Sound Modeling with Sinusoids Plus Noise", published in C. Roads, S. Pope, A. Picialli, G. De Poli, editors. 1997. *"Musical Signal Processing"*. Swets & Zeitlinger Publishers, retrieved from <http://web.media.mit.edu/~tristan/Classes/MAS.945/Papers/Technical/Serra_SMS_97.pdf> on Nov. 12, 2012,(1997), 25 pages.
Smith III, Julius O., "MUS421/EE367B Applications Lecture 9C: Time Scale Modification (TSM) and Frequency Scaling/Shifting", retrieved from <https//ccrma.stanford.edu/~jos/TSM/TSM.pdf> on Nov. 12, 2012, (Mar. 8, 2012), 15 pages.
Upperman, Gina "Changing Pitch with PSOLA for Voice Conversion", retrieved from <http://cnx.org/content/m12474/latest/?collection=col10379/1.1> on Nov. 12, 2012, 1 page.
Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.
Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download?doi=10.1.1.202.5460&rep=rep1&type=pdf> on Nov. 12, 2012, 4 pages.
Yuan, et al., "Image Deblurring with Blurred/Noisy Image Pairs", *Proceedings of ACM SIGGRAPH*, vol. 26, Issue 3, (Jul. 2007), 10 pages.
Final Office Action, U.S. Appl. No. 13/309,982, (Nov. 1, 2013), 34 pages.
Final Office Action, U.S. Appl. No. 13/310,032, (Oct. 31, 2013), 21 pages.
Felzenszwalb, Pedro F., et al., "Efficient Belief Propagation for Early Vision", *International Journal of Computer Vision*, 70(1), (2006), pp. 41-54.
Gastal, Eduardo S., et al., "Shared Sampling for Real-Time Alpha Matting", *Eurographics 2010*, vol. 29, No. 2, (2010), 10 pages.
He, Kaiming et al., "A Global Sampling Method for Alpha Matting", *CVPR 2011*, (2011), pp. 2049-2056.
Levin, Anat et al., "A Closed Form Solution to Natural Image Matting", *CVPR*, 2006, 8 pages.
Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, (Jun. 2006), pp. 109-112.
Radhakrishnan, Regunathan et al., "A Content-Adaptive Analysis and Representation Framework for Audio Event Discovery from "Unscripted" Multimedia", Hindawi Publishing Corporation, *EURASIP Journal on Applied Signal Processing*, vol. 2006, Article ID 89013, (2006), 24 pages.
Smaragdis, Paris "A Probabilistic Latent Variable Model for Acoustic Modeling", *NIPS* (2006), 6 pages.
Smaragdis, Paris "Supervised and Semi-Supervised Separation of Sounds from Single-Channel Mixtures", *ICA '07 Proceedings of the 7th international conference on Independent component analysis and signal separation*, (2007), 8 pages.
Smith, Alvy R., et al., "Blue Screen Matting", *SIGGRAPH 96 Conference Proceedings*, (Aug. 1996), 10 pages.
Yang, Qingxiong et al., "A Constant-Space Belief Propagation Algorithm for Stereo Matching", *CVPR* (2010), 8 pages.

(56) References Cited

OTHER PUBLICATIONS

Final Office Action, U.S. Appl. No. 13/690,755, Sep. 10, 2014, 7 pages.
Non-Final Office Action, U.S. Appl. No. 13/660,159, Oct. 1, 2014, 7 pages.
Restriction Requirement, U.S. Appl. No. 13/722,825, Oct. 9, 2014, 7 pages.
Supplemental Notice of Allowance, U.S. Appl. No. 13/310,032, Nov. 3, 2014, 4 pages.
Zhu, et al., "Fusion of Time-of-Flight Depth and Stereo for High Accuracy Depth Maps", IEEE Conference on Computer Vision and Pattern Recognition, Jun. 23, 2008, 8 pages.
"Adobe Audion", User Guide, 2003, 390 pages.
"MPEG Surround Specification", International Organization for Standardization, Coding of Moving Pictures and Audio; ISO/IEF JTC 1/SC 29/WG 11; Bangkok, Thailand, Jan. 19, 2006, 186 pages.
Non-Final Office Action, U.S. Appl. No. 13/675,711, Mar. 11, 2015, 14 pages.
Non-Final Office Action, U.S. Appl. No. 13/675,844, Dec. 19, 2014, 10 pages.
Non-Final Office Action, U.S. Appl. No. 13/681,643, Jan. 7, 2015, 10 pages.
Non-Final Office Action, U.S. Appl. No. 13/688,421, Feb. 4, 2015, 18 pages.
Non-Final Office Action, U.S. Appl. No. 13/690,755, Mar. 2, 2015, 8 pages.
Non-Final Office Action, U.S. Appl. No. 13/720,258, Mar. 3, 2015, 14 pages.
Notice of Allowance, U.S. Appl. No. 13/660,159, Mar. 10, 2015, 6 pages.
Notice of Allowance, U.S. Appl. No. 13/680,952, Mar. 17, 2015, 6 pages.
Restriction Requirement, U.S. Appl. No. 13/690,724, Feb. 26, 2015, 6 Pages.
Ioffe, "Improved Consistent Sampling, Weighted Minhash and L1 Sketching", ICDM '10 Proceedings of the 2010 IEEE International Conference on Data Mining, Dec. 2010, 10 pages.
Jehan, "Creating Music by Listening", In PhD Thesis of Massachusetts Institute of Technology, Retrieved from <http://web.media.mit.edu/~tristan/Papers/PhD_Tristan.pdf>,Sep. 2005, 137 pages.
"Adobe Audition 3.0 User Guide", 2007, 194 pages.
Corrected Notice of Allowance, U.S. Appl. No. 13/660,159, Apr. 28, 2015, 2 pages.
Corrected Notice of Allowance, U.S. Appl. No. 13/660,159, May 29, 2015, 2 pages.
Final Office Action, U.S. Appl. No. 13/675,711, Jun. 23, 2015, 14 pages.
Final Office Action, U.S. Appl. No. 13/681,643, May 5, 2015, 14 pages.
Non-Final Office Action, U.S. Appl. No. 13/690,724, Jun. 18, 2015, 7 pages.
Non-Final Office Action, U.S. Appl. No. 13/722,825, Mar. 25, 2015, 17 pages.
Notice of Allowance, U.S. Appl. No. 13/690,755, Jun. 5, 2015, 6 pages.
Supplemental Notice of Allowance, U.S. Appl. No. 13/680,952, Jun. 11, 2015, 3 pages.
Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.
Yang,"Stereo Matching with Color-Weighted Correlation, Hierarchical Belief Propagation, and Occlusion Handling", IEEE Transactions on Pattern Analysis and Machine Intelligence , vol. 31 Issue 3, Mar. 2009, 13 pages.
Corrected Notice of Allowance, U.S. Appl. No. 13/722,825, Sep. 21, 2015, 4 pages.
Final Office Action, U.S. Appl. No. 13/675,844, Aug. 14, 2015, 17 pages.
Final Office Action, U.S. Appl. No. 13/688,421, Jul. 29, 2015, 22 pages.
First Action Interview Office Action, U.S. Appl. No. 13/720,316, Oct. 22, 2015, 4 pages.
Non-Final Office Action, U.S. Appl. No. 13/681,643, Oct. 16, 2015, 27 pages.
Notice of Allowance, U.S. Appl. No. 13/720,258, Jul. 24, 2015, 8 pages.
Notice of Allowance, U.S. Appl. No. 13/720,258, Sep. 18, 2015, 2 pages.
"Notice of Allowance", Application No. 13/722,825, Aug. 28, 2015, 10 pages.
"Pre-Interview Communication", Application No. 13/720,316, Aug. 05, 2015, 3 pages.
"Supplemental Notice of Allowance", Application No. 13/690,755, Aug. 18, 2015, 4 pages.
Dueck,"Non-metric Affinity Propagation for Unsupervised Image Categorization", IEEE 11th International Conference on Computer Vision, 2007, Oct. 14, 2007, 8 pages.
Xiao,"Joint Affinity Propagation for Multiple View Segmentation", IEEE 11th International Conference on Computer Vision, 2007, Oct. 14, 2007, 7 pages.

* cited by examiner

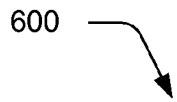

600

602
Output a user interface having a first representation of sound data generated from a first sound signal and a second representation of sound data generated from a second sound signal

604
Receive one or more inputs via interaction with the user interface that indicate that a first point in time in the first representation corresponds to a second point in time in the second representation

606
Generate aligned sound data from the sound data from the first and second sound signals based at least in part on correspondence of the first point in time in the sound data generated from the first sound signal to the second point in time in the sound data generated from the second sound signal

*Fig. 6*

SOUND ALIGNMENT USER INTERFACE

BACKGROUND

Sound alignment may be leveraged to support a wide range of functionality. For example, sound data may be captured for use as part of a movie, recording of a song, and so on. Parts of the sound data, however, may reflect capture in a noisy environment and therefore may be less than desirable when output, such as by being difficult to understand, interfere with desired sounds, and so on. Accordingly, parts of the sound data may be replaced by other sound data using sound alignment. Sound alignment may also be employed to support other functionality, such as to utilize a foreign overdub to replace the sound data with dialog in a different language.

However, conventional techniques that are employed to automatically align the sound data may prove inadequate when confronted with relatively long clips, clips having differing lengths, and so on. Accordingly, these conventional techniques may cause a user to forgo use of these techniques as the results were often inconsistent, could result in undesirable alignments that lacked realism, and so forth. This may force users to undertake multiple re-recordings of the sound data that is to be used as a replacement until a desired match is obtained, manual fixing of the timing by a sound engineer, and so on.

SUMMARY

Sound alignment user interface techniques are described. In one or more implementations, a user interface is output having a first representation of sound data generated from a first sound signal and a second representation of sound data generated from a second sound signal. One or more inputs are received, via interaction with the user interface, that indicate that a first point in time in the first representation corresponds to a second point in time in the second representation. Aligned sound data is generated from the sound data from the first and second sound signals based at least in part on correspondence of the first point in time in the sound data generated from the first sound signal to the second point in time in the sound data generated from the second sound signal.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 6 is a flow diagram depicting a procedure in an example implementation in which a user interface is output that is configured to receive inputs that specify points in time in representations of sound data that are to be aligned.

DETAILED DESCRIPTION

Overview

Sound alignment techniques may be employed to support a variety of different functionality. For example, sound data having a higher quality may be synchronized with sound data having a lower quality to replace the lower quality sound data, such as to remove noise from a video shoot, music recording, and so on. In another example, a foreign overdub may be used to replace original sound data for a movie with dialog in a different language. However, conventional auto-alignment systems could result in an output having incorrect alignment, could consume significant amounts of computing resources, and so on.

Sound alignment user interface techniques are described herein. In one or more implementations, a user interface is configured to enable a user to specify particular intervals of sound data that are to be aligned to each other. In this way, the techniques may operate on these portions to align corresponding sound data, which may result in an efficient use of computing resources as well as an increased likelihood that the sound data is correctly aligned. For example, these techniques may be used to align sound data even if the sound data does not have similar spectral characteristics. Further discussion of these and other examples may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
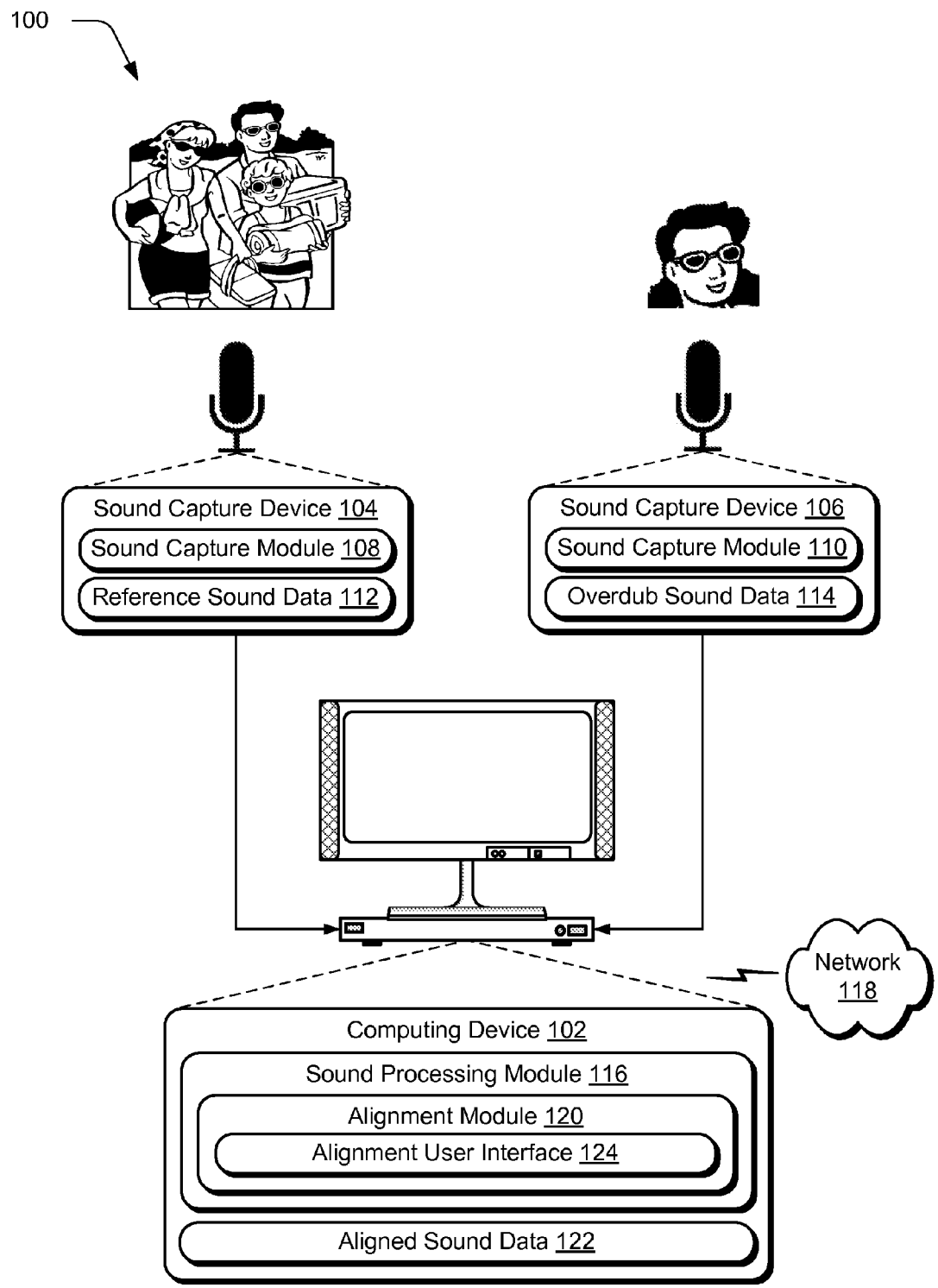
FIG. 1 is an illustration of an environment in an example implementation that is operable to employ user interface alignment techniques as described herein.

FIG. 1 is an illustration of an environment 100 in an example implementation that is operable to employ techniques described herein. The illustrated environment 100 includes a computing device 102 and sound capture devices 104, 106, which may be configured in a variety of ways.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The sound capture devices 104, 106 may also be configured in a variety of ways. Illustrated examples of one such configuration involves a standalone device but other configurations are also contemplated, such as part of a mobile phone, video camera, tablet computer, part of a desktop microphone, array microphone, and so on. Additionally, although the sound capture devices 104, 106 are illustrated separately from the computing device 102, the sound capture devices 104, 106 may be configured as part of the computing device 102, a single sound capture device may be utilized in each instance, and so on.

The sound capture devices 104, 106 are each illustrated as including respective sound capture modules 108, 110 that are representative of functionality to generate sound data, examples of which include reference sound data 112 and overdub sound data 114. Reference sound data 112 is utilized to describe sound data for which at least a part is to be replaced by the overdub sound data 114. This may include replacement of noisy portions (e.g., due to capture of the reference sound data 112 "outside"), use of a foreign overdub, and even replacement using sound data that has different spectral characteristics. Thus, the overdub sound data 114 may reference unaligned sound data that is to be processed for alignment with the reference sound data 112. Additionally, although illustrated separately for clarity in the discussion it should be apparent that these roles may be satisfied alternately by different collections of sound data (e.g., in which different parts are taken from two or more files), and so on.

Regardless of where the reference sound data 112, and overdub sound data 114 originated, this data may then be obtained by the computing device 102 for processing by a sound processing module 116. Although illustrated as part of the computing device 102, functionality represented by the sound processing module 116 may be further divided, such as to be performed "over the cloud" via a network 118 connection, further discussion of which may be found in relation to FIG. 7.

An example of functionality of the sound processing module 116 is represented as an alignment module 120. The alignment module 120 is representative of functionality to align the overdub sound data 114 to the reference sound data 112 to create aligned sound data 122. As previously described, this may be used to replace a noisy portion of sound data, replace dialog with other dialog (e.g., for different languages), and so forth. In order to aid in the alignment, the alignment module 120 may support an alignment user interface 124 via which user inputs may be received to indicate corresponding points-in-time of the reference sound data 112 and the overdub sound data 114. Further discussion of generation of the aligned sound data 122 and interaction with the alignment user interface 124 may be found in the following discussion and associated figure.

Figure 2:
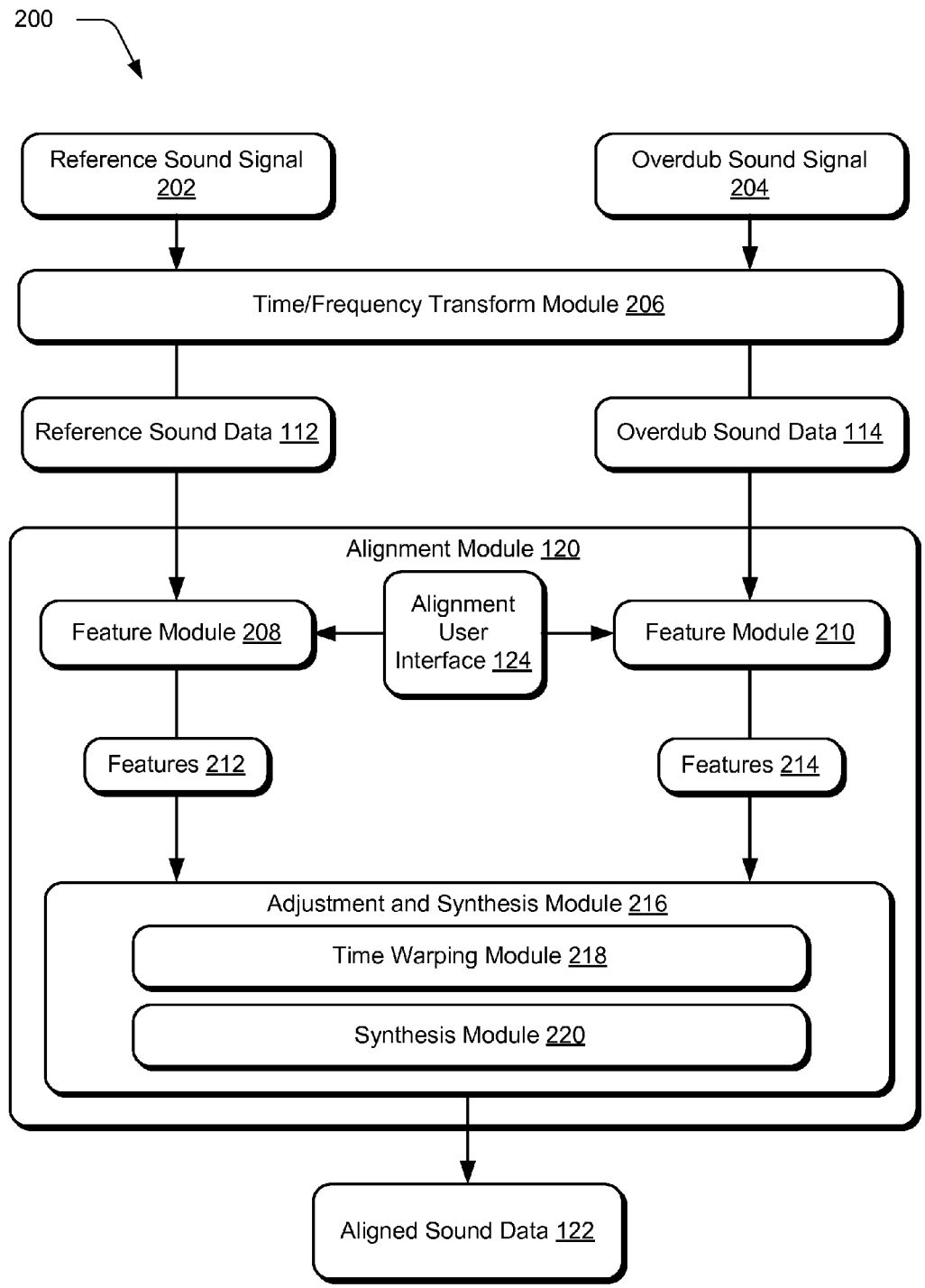
FIG. 2 depicts a system in an example implementation in which aligned sound data is generated from overdub sound data and reference sound data of FIG. 1 by leveraging an alignment user interface.

FIG. 2 depicts a system 200 in an example implementation in which aligned sound data 122 is generated from overdub sound data 114 and reference sound data 112 from FIG. 1. A reference sound signal 202 and an overdub sound signal 204 are processed by a time/frequency transform module 206 to create reference sound data 112 and overdub sound data 114, which may be configured in a variety of ways.

The sound data, for instance, may be used to form one or more spectrograms of a respective signal. For example, a time-domain signal may be received and processed to produce a time-frequency representation, e.g., a spectrogram, which may be output in an alignment user interface 124 for viewing by a user. Thus, the reference sound data 112 and overdub sound data 114 may be used to provide a time-frequency representation of the reference sound signal 202 and overdub sound signal 204, respectively, in this example.

Spectrograms may be generated in a variety of ways, an example of which includes calculation as magnitudes of short time Fourier transforms (STFT) of the signals. Additionally, the spectrograms may assume a variety of configurations, such as narrowband spectrograms (e.g., 32 ms windows) although other instances are also contemplated. The STFT sub-bands may be combined in a way so as to approximate logarithmically-spaced or other nonlinearly-spaced sub-bands. In doing so, potentially adverse effects (e.g., very dissimilar features) from differences in pitch between the two sound signals may be mitigated and small differences in pitch may not result in significant differences in spectral features. In various implementations, STFTs and sub-band representations may be calculated for each of the reference sound signal 202 and overdub sound signal 204 before computing respective features, although other implementations are also contemplated.

Overdub sound data 114 and reference sound data 112 are illustrated as being received for processing by respective feature modules 208, 210 of the alignment module 120. Although illustrated separately, a single feature module may also be utilized for processing both the overdub sound data 114 and the reference sound data 112. The feature modules 208, 210 are representative of functionality to identify features in the sound data that are usable to uniquely identify particular portions of the sound data, illustrated examples include features 212 of the reference sound data 112 and features 214 for the overdub sound data 114.

The features 212, 214 may take a variety of different forms. For example, the features 212, 214 may result from a calculation of bases (e.g., spectral characteristics) and weights (e.g., temporal features) of the reference sound data 112 and the overdub sound data 114, respectively. Bases, for instance, may include spectral characteristics such as spectral basis vectors, which may be considered spectral building blocks of the sound data. Weights may include temporal features, such as speech weights, noise weights, and so on. The weights may define a temporal evolution of a signal such that at each time instance of the signal, the signal may be defined by a linear combination of the blocks defined by the bases.

The feature modules 208, 210 may employ a variety of different techniques to compute the features 212, 214. For example, the features 212, 214 may be computed with an algorithm, such as Probabilistic Latent Component Analysis (PLCA), non-negative matrix factorization (NMF), non-negative hidden Markov (N-HMM), non-negative factorial hidden Markov (N-FHMM), and the like.

The features 212 identified in the reference sound data 112 and the features 214 identified from the overdub sound data 112 114 may then be used by an adjustment and synthesis module 216 to generate aligned sound data 122. This may include "speeding up" and "slowing down" portions of the overdub sound data 114 to match feature timing in the reference sound data 112.

For example, the features 212, 214 may each include matrices of speech weights for the reference sound data 112 and overdub sound data 114, respectively. Basis vectors and noise weights may be discarded. The features 212, 214 may be used to analyze how the overdub sound data 114 may be warped in time by the time warping module 218 to align the respective features, such as by a global offset or sampling factor, compressing, stretching, and so on.

The time warping module 218, for instance, may employ dynamic time warping that leverages a similarity matrix of the reference and overdub features, respectively. The similarity matrix may be configured in a variety of ways, such as a two-dimensional rectangular matrix. One dimension may express length, in number of windows, for the reference sound data 112 and the other dimension may be the length for the overdub sound data 114. Each element of the matrix may give a cosine distance between features.

An optimal path may then be determined to minimize the error between the features of the reference sound data 112 and overdub sound data 114, respectively, such that the path is most similar in the most number of planes. For instance, a path may indicate that to align a given frame of the reference sound data 112 and overdub sound data 114, the reference sound data 112 and the overdub sound data 114 are each to be advanced by a single frame. For another frame, a path may indicate that the reference sound data 112 is to be advanced two frames and the overdub sound data 114 is to remain on a current frame, i.e., is not to be advanced. The paths may indicate whether to stretch, compress, time-shift, or otherwise warp one of the signals to better match the other signal. An output of the time warping module 218 may then be used by the synthesis module 220 to form the aligned sound data 122 from the reference sound data 112 and the overdub sound data 114.

Thus, automatic time alignment may be performed by the adjustment and synthesis module 216 to stretch and compress sound data to match the timing of other sound data, e.g., the overdub sound data 114 to the reference sound data 112. This may be performed by dividing the sound data into a series of short frames and analyzing the spectral content of the frames. Based on this analysis, a determination may be made as to how the timing of the frames from the overdub sound data 114 is to be changed such that the spectral characteristics best match the frames in the reference sound data 112. That timing information may then be used to modify the timing of the overdub sound data 114 to match the desired timing of the reference sound data 112.

In conventional techniques, a user simply selected the beginning and end points of each clip that was to be aligned. An alignment algorithm was then used to determine how to align everything in between. However, these conventional techniques could have several drawbacks. For example, the longer the clip, the more likely it was to result in an incorrect alignment. Second, computation time is proportionate to the length of clips, such as the length of the overdub clip times the length of the reference clip. Therefore, if the clip length doubles, the computation time quadruples. Consequently, inaccuracies could be encountered and the processing could be resource intensive, which could result in delays to even achieve an undesirable result.

Accordingly, sound alignment user interface techniques may be employed that leverage an alignment user interface 124 to aid alignment of sound data. The alignment user interface 124, for instance, may be used to manually set one or more alignment points in representations of the reference sound data 112 and the overdub sound data 114. In this way, a user may indicate which points in the sound data are to correspond to each other. For example, if a user encountered a problem with the alignment, such as through automatic processing of two or more clips, the user may interact with the alignment user interface 124 to set alignment points to act as anchors in the troublesome regions. This may cause the adjustment and synthesis module 216 to align these points, and best align each of the other points (e.g., features 212, 214) taking into account the manual alignment points. Thus, accuracy of the alignment module 120 may be improved through use of the alignment user interface 124.

Efficiency of the alignment module 120 may also be improved through use of the alignment user interface 124. Through specification of the alignment points, for instance, an alignment task for the two clips in the previous example may be divided into a plurality of interval alignment tasks. Results of the plurality of interval alignment tasks may then be combined to create aligned sound data 122 for the two clips. For example, adding "N" pairs of alignment points may increase computation speed by a factor between "N" and "$N^2$". In an example implementation, an alignment task that conventionally took over a minute to complete by a computing device took less than one second using less than ten alignment points. An example of the alignment user interface 124 is discussed as follows and shown in a corresponding figure.

Figure 3:
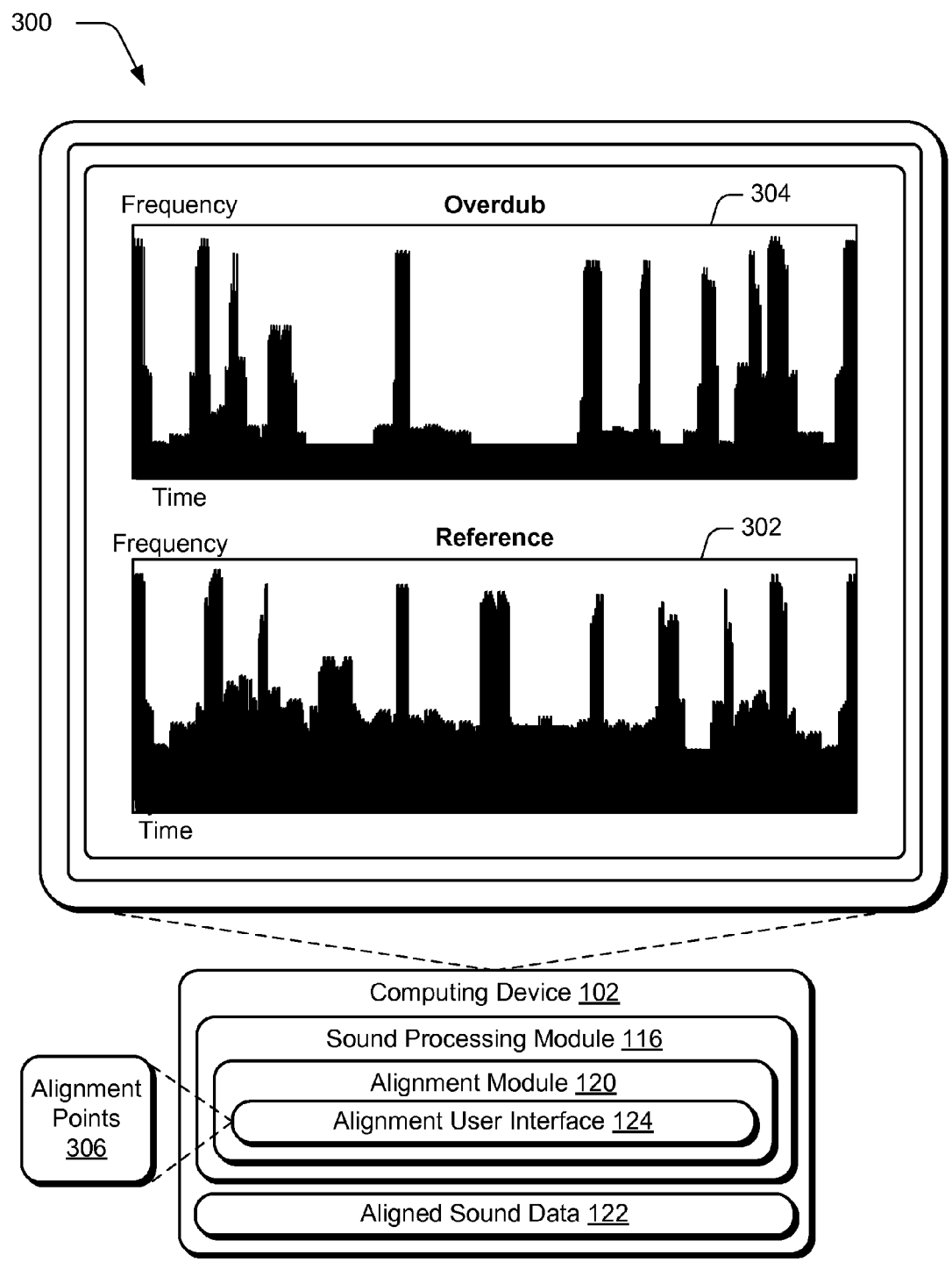
FIG. 3 depicts a system in an example implementation in which an example alignment user interface is shown that includes representations of the overdub and reference sound data.

FIG. 3 depicts an example implementation 300 showing the computing device 102 of FIG. 1 as outputting an alignment user interface 124 for display. In this example, the computing device 102 is illustrated as assuming a mobile form factor (e.g., a tablet computer) although other implementations are also contemplated as previously described. In the illustrated example, the reference sound data 112 and the overdub sound data 114 are displayed in the alignment user interface 124 using respective time-frequency representations 302, 304, e.g., spectrograms, although other examples are also contemplated.

The representations 302, 304 are displayed concurrently in the alignment user interface 124 by a display device of the computing device 102, although other examples are also contemplated, such as through sequential output for display. The alignment user interface 124 is configured such that alignment points 306 may be specified to indicate correspondence of points in time between the representations 302, 304, and accordingly correspondence of sound data represented at those points in time. The alignment module 120 may then generate aligned sound data 122 as previously described based on the alignment points 306. The alignment points 306 may be specified in a variety of ways, an example of which is discussed as follows and shown in the corresponding figure.

Figure 4:
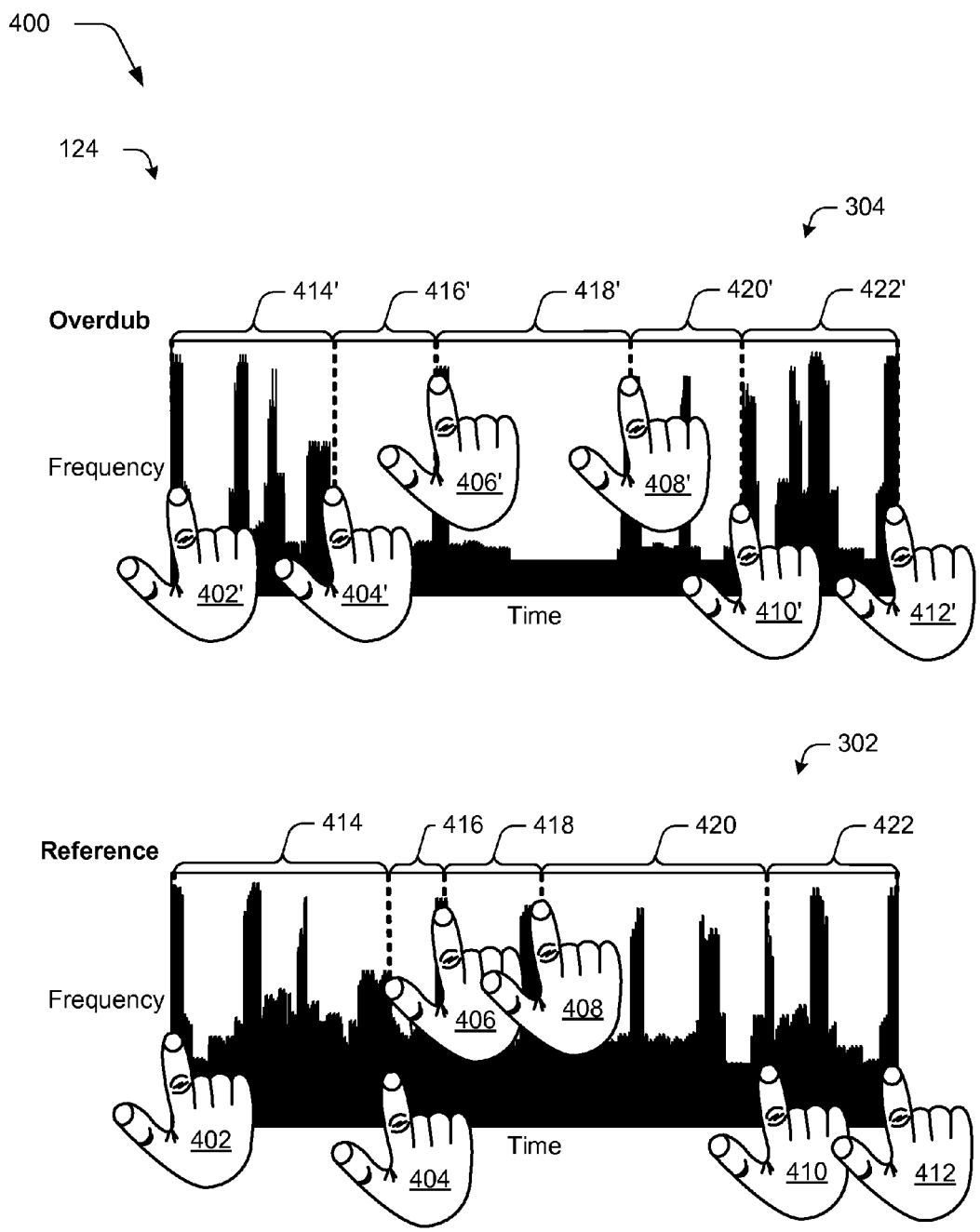
FIG. 4 depicts a system in an example implementation in which the example alignment user interface of FIG. 3 is shown as supporting interaction to manually specify alignment points.

FIG. 4 depicts an example implementation 400 in which the representations of the reference and overdub sound data 302, 304 are utilized to indicate corresponding points in time. In this implementation 400, a series of inputs are depicted as being provided via a touch input, although other examples are also contemplated, such as use of a cursor control device, keyboard, voice command, and so on. Correspondence of the alignment points and intervals is illustrated in the figure through use of a convention in which alignment point 402 of the representation 302 of the reference sound signal 112 corresponds to alignment point 402' of the representation 304 of the overdub sound signal 114 and vice versa.

A user, when viewing the representations 302, 304 of the reference and overdub sound signals 112, 114 may notice particular points in time that likely correspond based on similar spectral characteristics as displayed in the alignment user interface 124. For example, a user may note that spectral characteristics in the representations 302, 304 likely correspond to each other at alignment points 402, 402'. Accordingly, the user may indicate such through interaction with the alignment user interface by setting the alignment points 402, 402'. The user may repeat this by selecting additional alignment points 404, 404', 406, 406', 408, 408', 410, 410', which therefore also define a plurality of intervals 414, 414', 416, 416', 418, 418', 420, 420', 422, 422' as corresponding to each other.

This selection, including the order thereof, may be performed in a variety of ways. For example, a user may select an alignment point 402 in the representation 302 of the reference sound data 112 and then indicate a corresponding point in time 402' in the representation 304 of the overdub sound signal 114. This selection may also be reversed, such as by selecting an alignment point 402' in the representation 304 of the overdub sound data 114 and then an alignment point 402 in the representation 302 of the reference sound data 112. Thus, in both of these examples, a user alternates selections between the representations 302, 304 to indicate corresponding points in time.

Other examples are also contemplated. For example, the alignment user interface 124 may also be configured to support a series of selections made through interacting with one representation (e.g., alignment point 402, 404 in representation 302) followed by a corresponding series of selections made through interacting with another representation, e.g., alignment points 402', 404' in representation 302. In another example, alignment points may be specified having unique display characteristics to indicate correspondence, may be performed through a drag-and-drop operations, and so on. Further, other examples are also contemplated, such as to specify the intervals 414, 414' themselves as corresponding to each other, for which a variety of different user interface techniques may be employed.

Regardless of a technique used to indicate the alignment points and/or intervals, a result of this manual alignment through interaction with the alignment user interface 124 indicates correspondence between the sound data. This correspondence may be leveraged to generate the aligned sound data 122. An example of the alignment user interface 124 showing a representation of the aligned sound data 122 is discussed as follows and shown in the corresponding figure.

Figure 5:
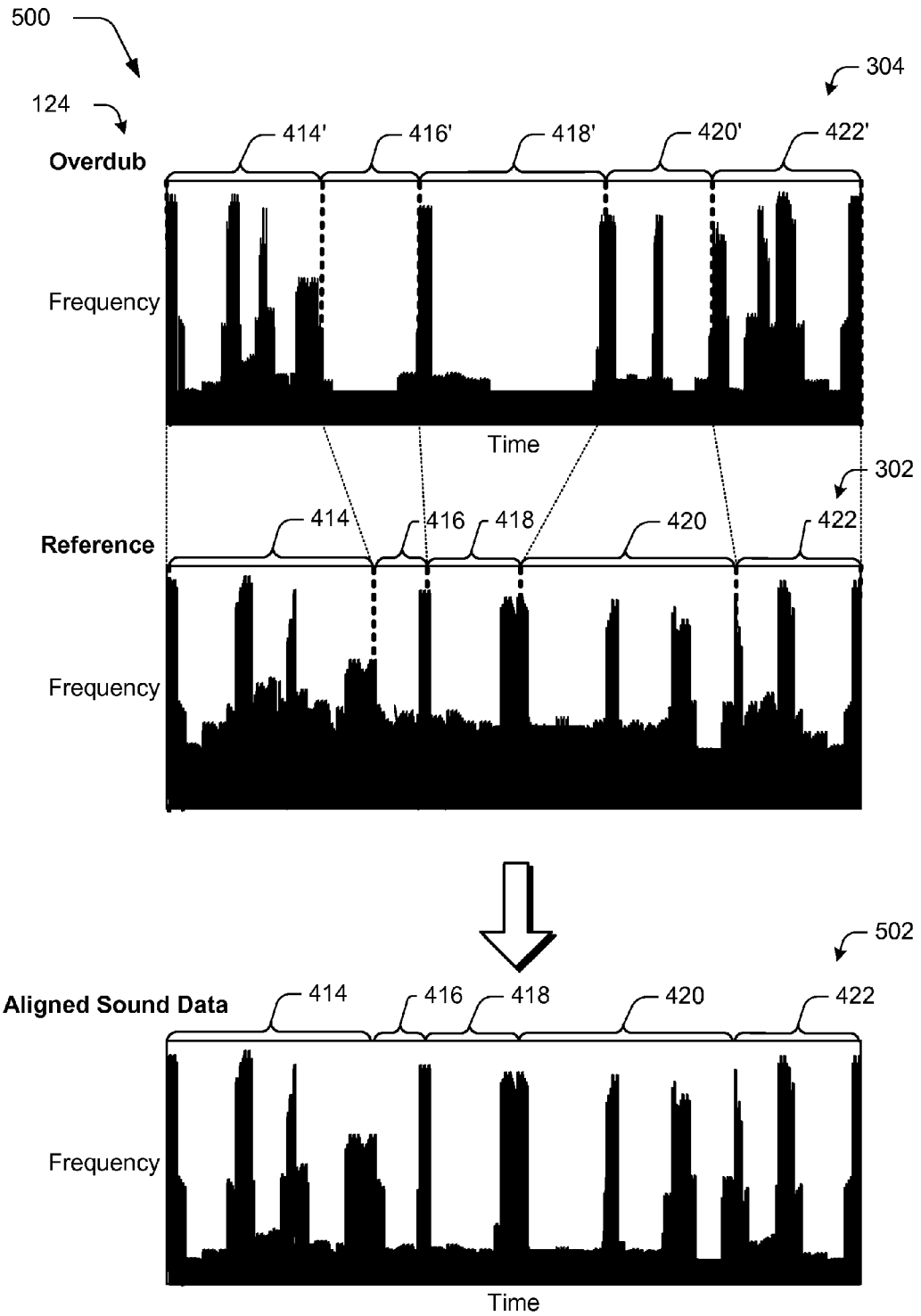
FIG. 5 depicts a system in an example implementation in which the example alignment user interface is shown as including a result of aligned sound data generated based at least in part on the specified alignment points in FIG. 4.

FIG. 5 depicts an example implementation 500 of the alignment user interface 124 as including a representation 502 of aligned sound data 122. As shown in the representations 302, 304 of the reference sound data 112 and the overdub sound data, intervals 414-422 in the representation 302 of the reference sound data 112 have lengths (i.e., describe amounts of time) that are different than the intervals 414'-422' in the representation 304 of the overdub sound data 114. For example, interval 414 references an amount of time that is greater than interval 414', interval 418 references an amount of time that is less than interval 418', and so on. It should be readily apparent, however, that in some instances the lengths of the intervals may also match.

The alignment module 120 may use this information in a variety of ways to form aligned sound data 122. For example, the alignment points may be utilized to strictly align those points in time specified by the alignment points 306 for the reference and overdub sound data 112, 114 as corresponding to each other. The alignment module 120 may then utilize techniques to align sound data within the intervals, such as to align features 212, 214 as described previously. This may include stretching and/or compressing portions of the sound data included within the intervals to arrive at aligned sound data for that interval.

Additionally, processing of the sound data by interval may be utilized to improve efficiency as previously described. The alignment module 120, for instance, may divide the alignment task for the reference sound data 112 and the overdub sound data 114 according to the specified intervals. For example, the alignment task may be divided into "N+1" interval alignment tasks in which "N" is a number of user-defined alignment points 306. Two or more of the interval alignment tasks may also be run in parallel to further speed-up performance. Once alignment is finished for the intervals, the results may be combined to arrive at the aligned sound data 122 for the reference sound data 112 and the overdub sound data 114. In one or more implementations, a representation 502 of this result of the aligned sound data 114 may also be displayed in the alignment user interface 124.

As previously described, the overdub sound data 114 may be configured in a variety of ways. For instance, in a foreign dubbing embodiment, the techniques may allow for the audio in one signal to more closely follow the other signal (e.g., second signal, reference signal) such that utterances or other audio overlap more closely. For example, sound data that corresponds to certain audio features from the two signals may be stretched, compressed, or shifted such that the lengths of those features are same and that they overlap in time, thus aligning the sound data to each other. As another example, consider a scenario in which two saxophones in a musical performance are off in timing. The techniques may be used to automatically align the signals from the two saxophones to be more closely synchronized.

Additionally, the techniques may be used in situations in which both signals are noisy, in situations in which speakers from the two signals have significantly different spectral characteristics, and so on. For example, these techniques may be used to manually specify particular points in time to be aligned even if those points have quite different spectral characteristics, such as to align different instruments, a foreign overdub, and so forth.

Example Procedures

The following discussion describes user interface techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-5.

FIG. 6 depicts a procedure 600 in an example implementation in which a user interface in output that is usable to manually align particular points in time to each other in sound data. A user interface is output having a first representation of sound data generated from a first sound signal and a second representation of sound data generated from a second sound signal (block 602). An alignment user interface 124, for instance, may be output that includes representations 302, 304 of reference sound data 112 and overdub sound data 114, such as time-frequency representations.

One or more inputs are received via interaction with the user interface that indicate that a first point in time in the first representation corresponds to a second point in time in the second representation (block 604). These inputs may be provided in a variety of ways, such as a touch input, through use of a cursor control device (e.g., mouse), keyboard input, voice command, and so on.

Aligned sound data is generated from the sound data from the first and second sound signals based at least in part on correspondence of the first point in time in the sound data generated from the first sound signal to the second point in time in the sound data generated from the second sound signal (block 606). The alignment module 120, for instance, may generate aligned sound data 122 from the reference and overdub sound data 112, 114 based on the alignment points 306 as well as respective features 212, 214 identified in the sound data.

Example System and Device

Figure 7:
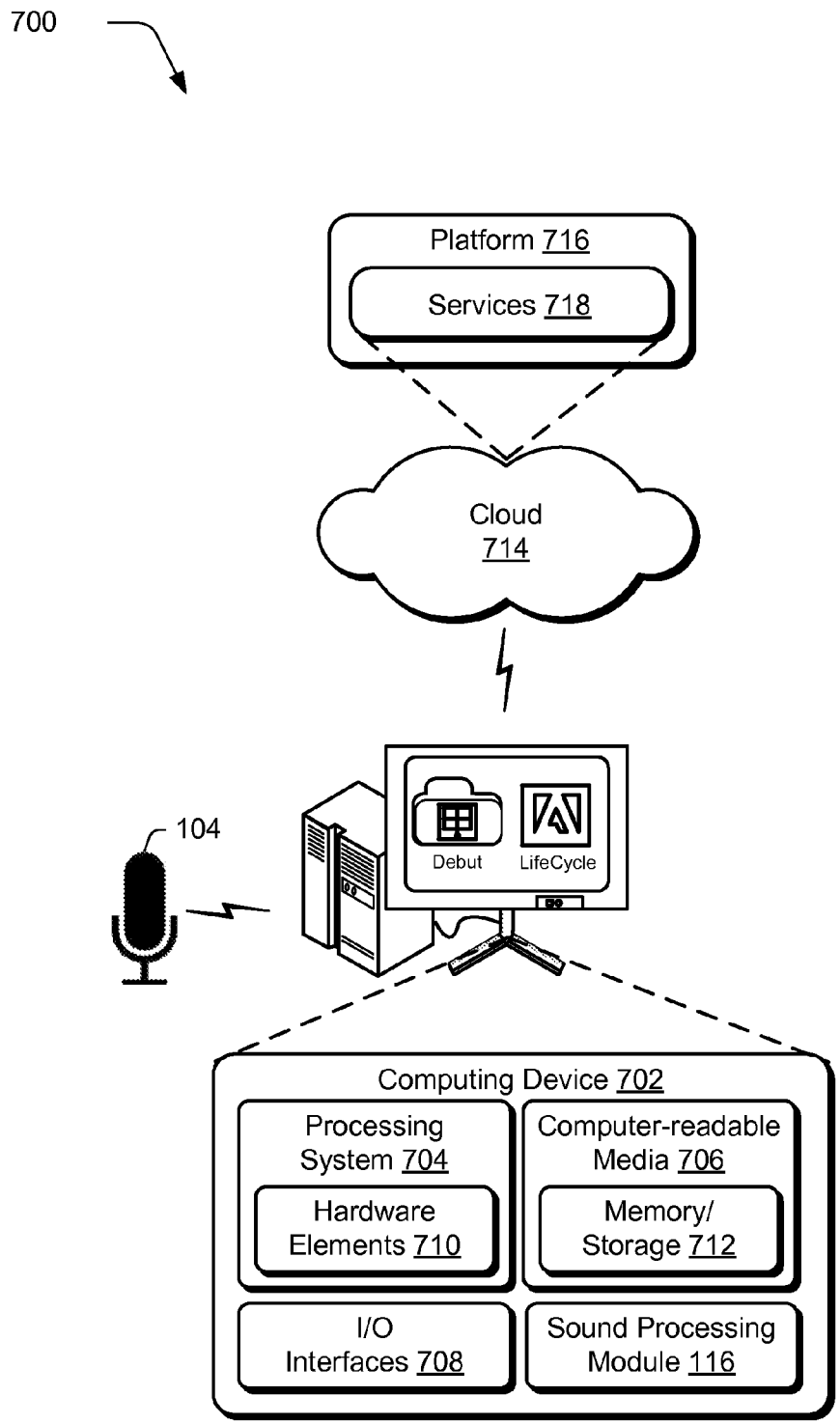
FIG. 7 illustrates an example system including various components of an example device that can be implemented as any type of computing device as described and/or utilize with reference to FIGS. 1-6 to implement embodiments of the techniques described herein.

FIG. 7 illustrates an example system generally at 700 that includes an example computing device 702 that is representative of one or more computing systems and/or devices that may implement the various techniques described herein. This is illustrated through inclusion of the sound processing module 116, which may be configured to process sound data, such as sound data captured by an sound capture device 104. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device embodiment, implementation of functionality described herein may be distributed throughout the system 700. For example, the functionality may be implemented in part on the computing device 702 as well as via the platform 716 that abstracts the functionality of the cloud 714.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method implemented by one or more computing devices, the method comprising:
   outputting a user interface having a first representation of sound data generated from a first sound signal and a second representation of sound data generated from a second sound signal;
   identifying, automatically and without user input, a first portion of the first representation that contains one or more features that correspond to one or more features in a second portion of the second representation;
   receiving one or more manual inputs via interaction with the user interface, the manual inputs being selection of a first point in time within the first representation and selection of a corresponding second point in time within the second representation; and
   generating aligned sound data from the sound data from the first and second sound signals by at least:
   aligning the first point in time in the sound data generated from the first sound signal to the second point in time in the sound data generated from the second sound signal, the aligning effective to anchor the first point and the second point to each other in the aligned sound data; and
   adjusting, automatically and without user input, the second portion of the second representation containing the one or more features to have a slower speed or a faster speed, the adjustment effective to align in time the one or more features in the second portion with the one or more features in the first portion without changing the alignment of the first point with the second point.

2. The method as described in claim 1, wherein the one or more manual inputs define corresponding intervals in the sound data generated from the first and second sound signals, respectively.

3. The method as described in claim 2, wherein a plurality of said intervals are indicated, via manual interaction with the user interface, as corresponding between the sound data of the first and second sound signals, respectively, and the generating of the aligned sound data is performed individually for corresponding said intervals to generate the aligned sound data.

4. The method as described in claim 1, wherein the one or more features are spectral basis vectors, speech weights, or noise weights.

5. The method as described in claim 1, wherein the one or more features are computed using one or more of: probabilistic latent component analysis, non-negative matrix factorization, non-negative hidden Markov model, or non-negative factorial hidden Markov model.

6. The method as described in claim 1, wherein the first and second representations describe time and frequency of the sound data generated from the first and second sound signals, respectively.

7. The method as described in claim 6, wherein the sound data from the first and second sound signals are computed using short time Fourier transforms.

8. The method as described in claim 1, wherein the adjusting is accomplished by using one or more of: global offset, sampling factor, compression, or stretching.

9. The method as described in claim 1, wherein the first sound signal is an overdub sound signal and the second sound signal is a reference sound signal.

10. A system comprising:
    at least one module implemented at least partially in hardware and configured to output a user interface that is usable to manually select points within a plurality of representations of sound data generated from a plurality of sound signals, each selected point in a representation corresponding to a selected point in each other representation and the selected points within each representation defining a plurality of corresponding intervals within the representations of sound data; and
    one or more modules implemented at least partially in hardware and configured to generate aligned sound data from the sound data generated from the plurality of sound signals using the defined plurality of corresponding intervals by:
    aligning each selected point within a representation to the corresponding selected point within each other representation, the aligning effective to anchor the corresponding points to each other in the aligned sound data;

automatically and without user intervention, dividing an alignment task for aligning the sound data generated from the plurality of sound signals into a plurality of interval alignment tasks, the interval alignment tasks being alignment of each defined interval within each representation with the corresponding defined interval within each other representation to produce aligned intervals without changing the alignment of the corresponding selected points;

combining the aligned intervals from the plurality of representations; and using the combination of the aligned intervals as the aligned sound data.

11. The system as described in claim 10, wherein a first said interval defined for a first said representation has a length in time that is different than a second said interval defined for a second said representation.

12. The system as described in claim 11, wherein the one or more modules are configured to generate the aligned sound data by adjusting, automatically and without user intervention, the second interval to have a slower speed or a faster speed such that it is aligned in time with the corresponding first interval.

13. The system as described in claim 10, wherein at least two of the plurality of interval alignment tasks are configured to be executed in parallel by the one or more modules.

14. The system as described in claim 12, wherein the adjusting is accomplished by using one or more of: global offset, sampling factor, compression, or stretching.

15. The system as described in claim 10, wherein the plurality of representations of sound data are computed using short time Fourier transforms.

16. The system as described in claim 10, wherein the representations describe time and frequency of the sound data generated from respective ones of the plurality of sound signals.

17. One or more non-transitory computer-readable storage media having instructions stored thereon that, responsive to execution on a computing device, causes the computing device to perform operations comprising:

outputting a user interface having a first representation of sound data generated from a first sound signal and a second representation of sound data generated from a second sound signal;

identifying, automatically and without user input, a first portion of the first representation that contains one or more features that correspond to one or more features in a second portion of the second representation;

receiving one or more manual inputs via interaction with the user interface, the manual inputs being selection of a first point in time within the first representation and selection of a corresponding second point in time within the second representation; and generating aligned sound data from the sound data generated from the first and second sound signals at least in part by:

aligning the first manually selected point in time in the sound data generated from the first sound signal to the second manually selected point in time in the sound data generated from the second sound signal, the aligning effective to anchor the first point and the second point to each other in the aligned sound data; and adjusting, automatically and without user input, the second portion to have a slower speed or a faster speed, the adjustment effective to align in time the one or more features in the second portion with the one or more features in the first portion without changing the alignment of the first and second manually selected points.

18. The one or more non-transitory computer-readable storage media as described in claim 17, wherein the generating of the aligned sound data further comprises:

dividing the first and second representations of sound data into a plurality of intervals, each interval in the first representation corresponding to an interval in the second representation; and dividing an alignment task for the sound data generated from the first and second sound signals into a plurality of interval alignment tasks that involve the corresponding intervals.

19. The one or more non-transitory computer-readable storage media as described in claim 18, wherein at least two of the plurality of interval alignment tasks are configured to be executed in parallel.

20. The one or more non-transitory computer-readable storage media as described in claim 18, wherein the generating is performed such that the aligned sound data is generated from the sound data of the first and second sound signals from a combination of results of the plurality of interval alignment tasks.

* * * * *